No. 685,743. Patented Nov. 5, 1901.
W. E. CRANE.
MACHINE FOR SHEARING OR CUTTING METAL.
(Application filed Oct. 27, 1900.)
(No Model.) 3 Sheets—Sheet 1.
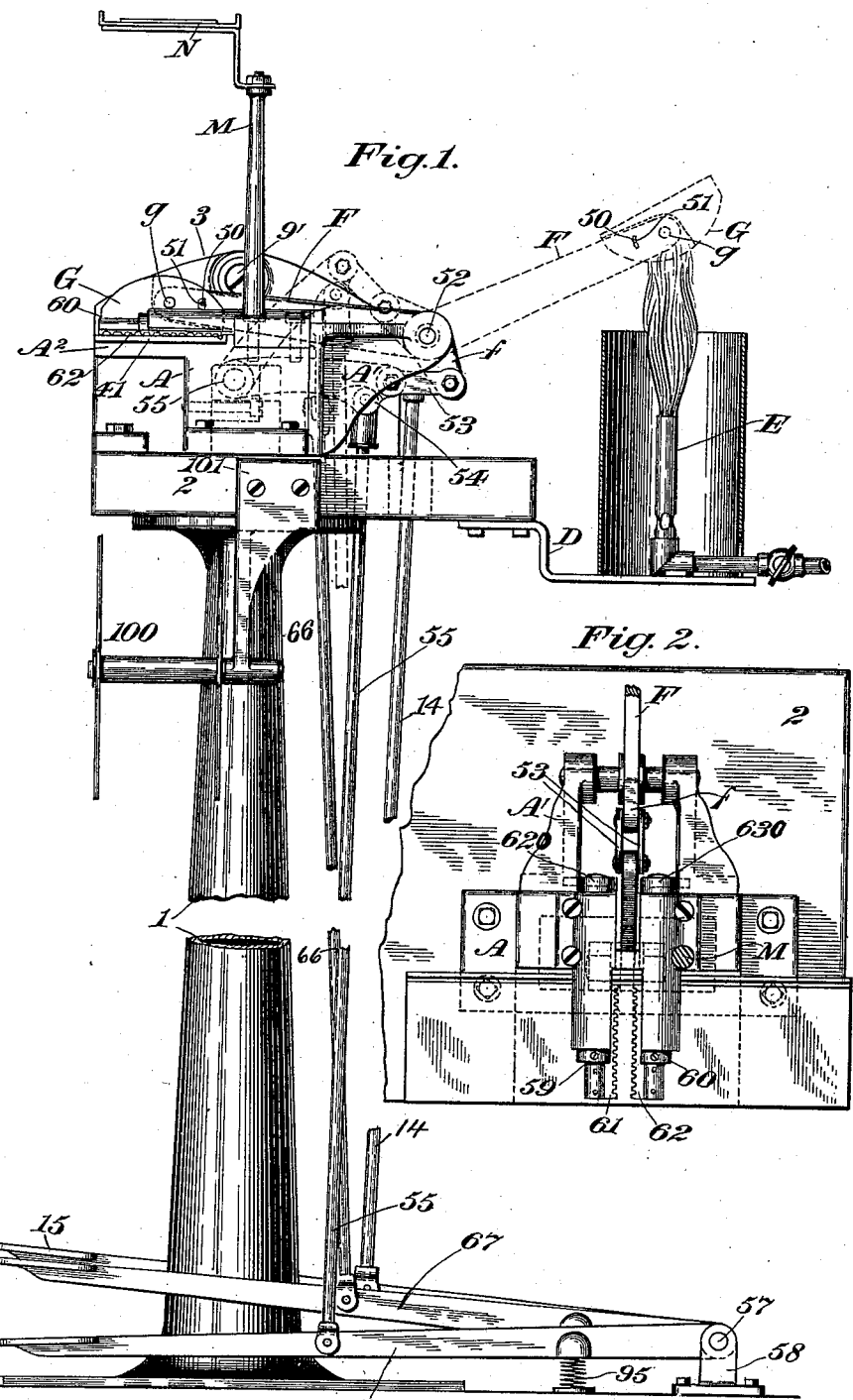
Witnesses:
R. W. Pittman
L. L. Edwards
Inventor:
Walter E. Crane.
By his Attorney,
F. H. Richards.

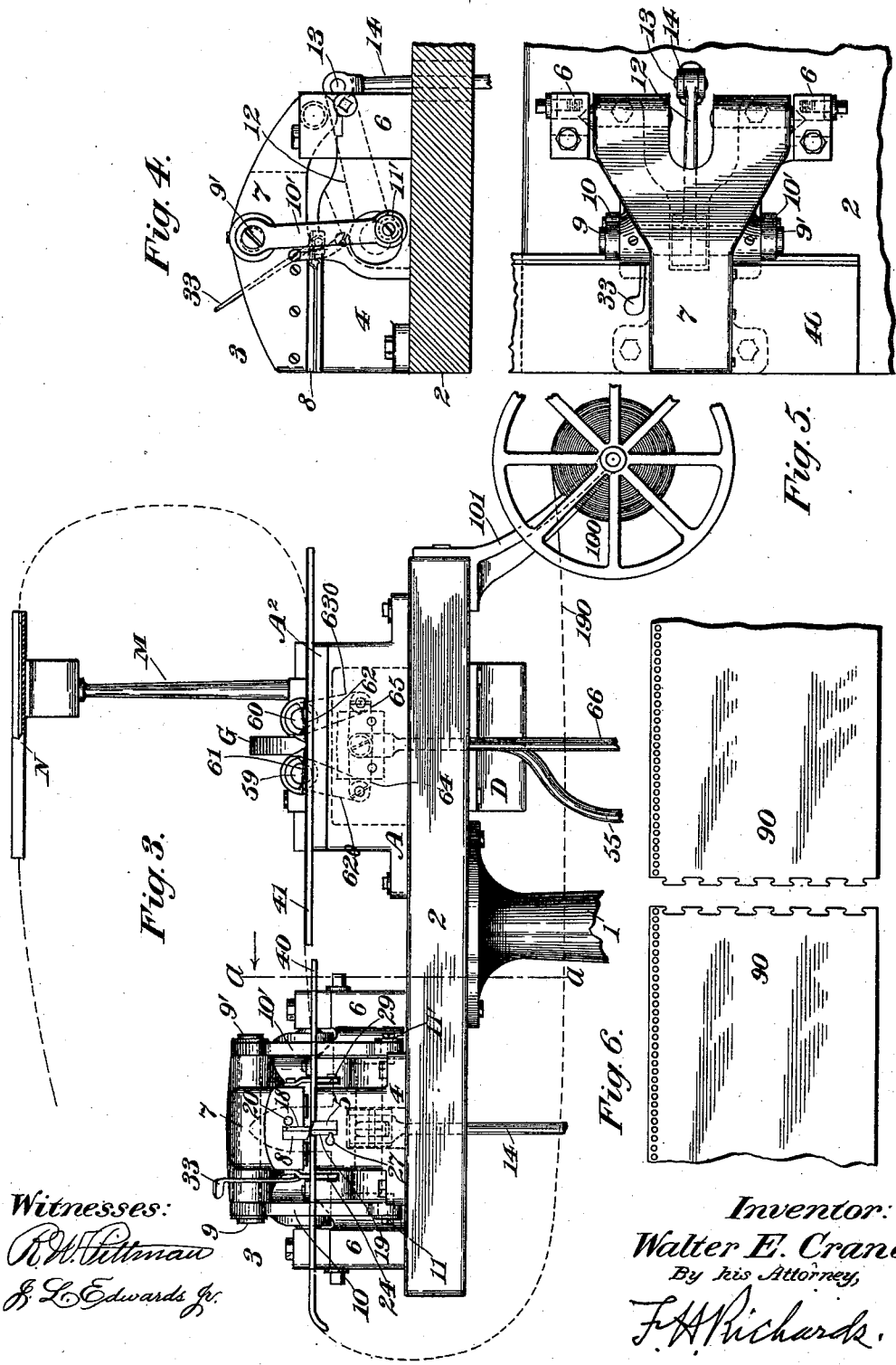

No. 685,743. Patented Nov. 5, 1901.
W. E. CRANE.
MACHINE FOR SHEARING OR CUTTING METAL.
(Application filed Oct. 27, 1900.)

(No Model.) 3 Sheets—Sheet 3.

Witnesses:
R. W. Pittman
L. L. Edwards Jr.

Inventor:
Walter E. Crane.
By his Attorney,
F. H. Richards.

THE NORRIS PETERS CO., PHOTO-LITHO., WASHINGTON, D. C.

UNITED STATES PATENT OFFICE.

WALTER E. CRANE, OF EL PASO, TEXAS, ASSIGNOR TO THE POLLARD-ALLING MANUFACTURING COMPANY, OF NEW YORK, N. Y., A CORPORATION OF NEW JERSEY.

MACHINE FOR SHEARING OR CUTTING METAL.

SPECIFICATION forming part of Letters Patent No. 685,743, dated November 5, 1901.

Application filed October 27, 1900. Serial No. 34,581. (No model.)

*To all whom it may concern:*

Be it known that I, WALTER E. CRANE, a citizen of the United States, residing in El Paso, in the county of El Paso and State of Texas, have invented certain new and useful Improvements in Machines for Shearing or Cutting Metal, of which the following is a specification.

My invention relates to an apparatus for shearing or cutting metal, and is primarily designed for use in connection with a plant embodying means for uniting the ends of metallic sheets to form a continuous strip having type-impressions to be employed with what are known as "addressing-machines" for printing the mailing directions upon blanks to be applied to newspapers, &c.

With this end in view the object of my invention is the provision of a metal shearing or cutting machine which will sever from the continuous strip on predetermined lines blanks containing the names or addresses of subscribers whose subscriptions have expired and will also sever from other sheets of the same material blanks containing addresses that it is desired to substitute for those withdrawn from said strip. This metal shearing or cutting machine is provided with a punch or die which coöperates with a complementary die in the bed-plate of the machine and produces on the ends of the strip a notched dovetail-joint formation adapted either to be united with the original continuous strip after the addresses have been removed therefrom or to be joined to blanks containing new addresses, as above set forth.

A further object of the invention is to provide an improved construction of metal shearing or cutting machine, all as hereinafter described.

Figure 7:
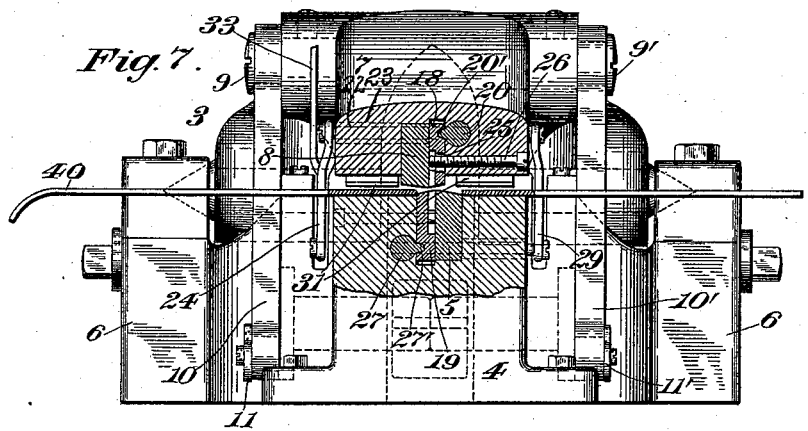
Figure 8:
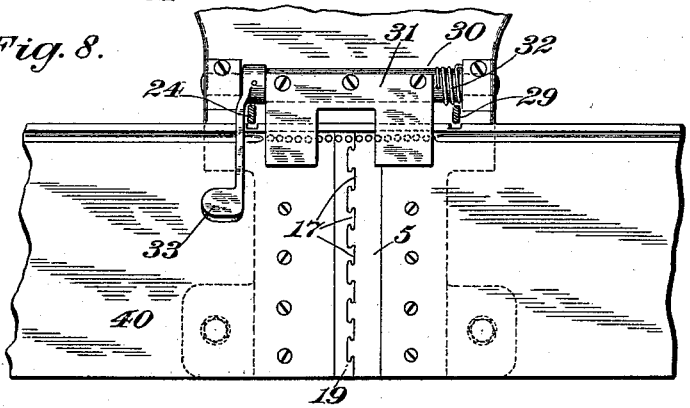
Figures 9, 10:
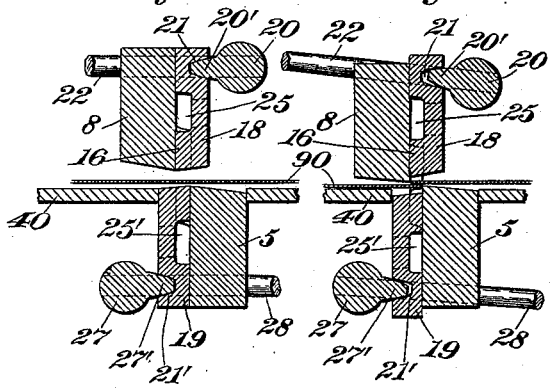
Figure 11:
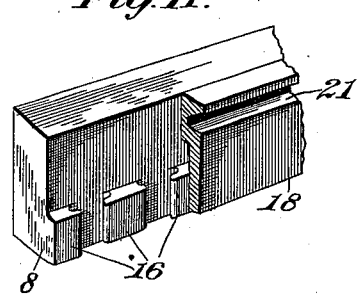

Referring to the accompanying drawings, Figure 1 is a side elevation of a plant including this improved cutting-machine looking toward the left in Fig. 3. Fig. 2 is a plan view of a part of the soldering-machine which may be employed. Fig. 3 is a front elevation of such plant, showing the metal shearing or cutting machine and a soldering-machine located side by side on the same table. Fig. 4 is a section on line *a a*, Fig. 3, looking in the direction of the arrow and representing in side elevation the shearing or cutting machine. Fig. 5 is a plan view of said shearing or cutting machine. Fig. 6 is a plan view of a printing strip or sheet representing the notched dovetail-joint connection formed therein by the shearing or cutting machine when severing the same. Fig. 7 is a transverse longitudinal section of the improved shearing-machine, parts of the same being shown in elevation. Fig. 8 is a plan view of the bed-die of the shearing-machine and of a clamp for holding the sheet-metal strip thereon. Figs. 9 and 10 are sectional details illustrating the shearing-dies and the strippers coöperating therewith. Fig. 11 is a perspective view of one of the shearing-dies, showing the teeth or projections thereon which coöperate with similarly-shaped openings in the lower die and a stripper-plate applied to the side of said shearing-die.

Referring to the drawings, in which like characters designate like parts throughout the several views, the numeral 1 designates a post or pillar having a flange at its top, to which the bed-plate 2 of the plant is attached in any suitable manner. Mounted on this bed-plate is a metal shearing or cutting machine, (designated in a general way by 3,) which will now be described. This machine, as shown, embodies a frame 4, to which the various operative parts and the bed-die 5 are connected, and pivoted to a standard 6 of said frame is a head 7, carrying the upper die 8 of the machine. Connected to studs or projections 9 9' on each side of said head are links 10 10', articulated at their lower ends to cranks or wrist-pins 11 11', which are operated by a lever 12, having a pivot 13, to which a pitman or rod 14, leading to a suitable treadle 15, is attached. Die 8, carried by head 7, is provided on its working face with a series of punches or projections 16, which conform to the series of openings 17 in the lower die 5, and at one side of said die 8 is a stripper-plate 18, operating in a manner hereinafter set forth, a similar stripper-plate 19 being movable at the side of said lower die 5.

Mounted in bearings of the machine-frame is a rocker 20, having a nose or projection 20', adapted to fit in a recess 21 in the stripper 18, and connected to this rocker is an arm or bar 22, passing through an opening 23 of larger dimensions than said bar (see dotted lines, Fig. 7) in the head 7. To one end of this arm or bar 22 is attached a link 24, (shown connected at its lower end to the framework of the machine,) the construction being such that as the head 7 rises after the die 8 has performed its work the rocker 20 will be oscillated and the stripper 18 forced downward to clear the strip or sheet from said die if it should have adhered thereto. This stripper is slotted, as at 25, to receive a screw or projection 26 in head 7, which screw holds die 8 in position. Combined with lower die 5, which, as above stated, has teeth or projections conforming to those of the upper die, is a second stripper 19, operated in a similar manner, a rocker 27 being mounted in the frame and having a nose 27', engaging a recess or groove in said stripper. This rocker 27 is connected with a bar 28, extending through an opening larger than said bar in the bed, and said bar is attached to a link 29, connected at its upper end to the head 7, so that when said head rises the rocker will be actuated and the stripper shifted to free the sheet from the lower die.

Mounted in the machine-frame adjacent to the bed-plate carrying the lower die is a rock-shaft 30, carrying a bifurcated presser foot or plate 31, the arms of which bear upon the sheet to be punched and firmly clamp the same against the die. Normally this presser foot or plate is thrown free of the bed-die by a torsion-spring 32, it being pressed down on said die against the action of said spring when it is desired to clamp the sheet by a manually-actuated handle or lever 33.

Shown upon the bed-plate 2 and located at the right of the metal shearing or punching machine and in line therewith is a soldering-machine of improved construction which constitutes the subject-matter of my contemporaneously-pending application, Serial No. 34,582, filed October 27, 1900. This soldering-machine is shown having a suitable frame, (designated generally by A,) which is bolted or otherwise secured to the bed-plate 2 and in which the various parts of the machine are mounted.

Attached to the bed-plate 2 of the plant, adjacent to the soldering-machine, is an extension or bracket D for supporting a heating device of any desired kind, shown, for the purpose of illustration, as a gas-jet E.

Pivoted in an extension A' of frame A is an arm or lever F, to the forward end of which a soldering-iron G is connected, as by a pivot $g$, the movement of said soldering-iron around its axis being limited by a pin 50, traveling in a short slot 51 in the lever F. (See dotted lines, Fig. 1.) This soldering-iron is shown of oblong form and of a length sufficient on its working surface to conform to the width of the bed-plate $A^2$ of the soldering-machine, upon which the material to be united is placed. Arm or lever F, which is pivoted at 52 to extension A' of frame A, is equipped with an arm $f$, to which links 53 are connected, these links being in turn articulated to a long link, (shown by dotted lines in Fig. 1 and designated by 54 in said figure,) said link 54 being pivoted at 55 to the frame of the machine. These links 53 and 54 constitute a toggle connection for operating the arm or lever F, carrying the soldering-iron, in a manner hereinafter set forth. Connected to one of these links, as 54, is a pitman or rod 55, articulated at its lower end to a treadle 56, pivoted at 57 on a short standard 58, bolted to the floor. This treadle is normally raised by a spring 95 and through the connections described tends automatically to throw the arm F and soldering-iron G to a position over the heating device, (see dotted lines in Fig. 1;) but when the treadle is depressed, as shown in Fig. 1, the toggle is straightened and the soldering-iron is thrown into position for work.

Mounted in suitable bearings of the soldering-machine frame A are rock-shafts or bars 59 and 60, to which serrated clamping-plates 61 and 62 are attached, the serration of said plates forming separated bearing-points which will clamp the work and not interfere with the flow of solder along the joint of the same. Projecting from these bars 59 and 60 are extensions 620 and 630, respectively, connected at their lower ends to links 64 and 65, which constitute a toggle-joint. Articulated to these joints 64 and 65 is a pitman or rod 66, connected at its lower end to a treadle 67, which is in turn mounted upon the pivot 57 of the bracket 58. A suitable spring (not shown) will usually be employed for normally raising said treadle 67, and thereby, through the connections described, moving the serrated clamping-plates to the position shown in Figs. 2 and 3, when they operate to clamp the work to be soldered on the bed-plate of the machine.

For receiving continuous strips an ordinary reel 100 may be employed, secured in the bracket 101, projecting from the bed-plate 2, as shown in Fig. 3, and rising from the soldering-machine frame A is a standard M, to which a table or support N may be attached for sustaining a portion of the continuous strip while the splicing operation is being performed on the end thereof. As shown by the line 190 in Fig. 3, the strip as it is uncoiled from the reel may be carried along under the bed-plate 2 of the plant and over the table 40 of the shearing and cutting machine, and after having been cut in the manner illustrated in Fig. 6 by the dies of said machine it is conveyed to the soldering-machine and connected either with a new blank to be united thereto or reunited to form a continuous strip in the manner above stated.

In Fig. 6 I have shown the form of joint produced by the shearing or cutting machine upon the portions of a metallic strip or sheet 90 to be united, and, as will be seen, this joint is of notched dovetail formation, the projections on the edge of one part of the sheet being adapted to interlock with those located on the other in a well-known way.

After the continuous strip has been severed in the manner indicated and it is desired to splice the same either to a new strip or to a section of the old strip the parts of the joint are united and the strip is fed along the table 40 of the shearing-machine and upon a similar table 41 of the soldering-machine. It is then passed beneath the soldering-iron and securely clamped on the bed in the manner above stated. Solder is now applied to the joint, and the soldering-iron is brought down to fuse the same and cause it thoroughly to penetrate all of the interstices of said joint. After this the sheet or strip may be wound upon a reel (not shown) attached to a convenient point of the machine-bed.

Should it be desired to feed the continuous strip to be severed through the soldering-machine before it reaches the shearing or cutting machine, this can be readily accomplished in an obvious manner, the reel 100 being conveniently located for such action.

While a type of soldering-machine like that set forth in my application above mentioned is herein shown and described, yet it is distinctly to be understood that other kinds of soldering-machines could be employed, if found desirable and convenient.

Having described my invention, I claim—

1. In a metal shearing or cutting machine, the combination, with a punching-die formed with a series of punches or projections, of means for actuating said die; a stripper located adjacent to said die; a rocker coöperating with said stripper; and means for actuating said rocker.

2. In a metal shearing or cutting machine, the combination, with two opposing dies formed with notched cutting-surfaces, of strippers coöperating with said dies; rock-shafts for actuating said strippers; means for connecting one of said rock-shafts with the head carrying the movable die; and means for connecting the other of said strippers with the machine-frame.

3. In a metal shearing or cutting machine, the combination, with a movable head or lever carrying a shearing or cutting die having a notched surface, of a grooved stripper located adjacent to the working end of said die; a rock-shaft having a projection entering the groove of said stripper; a rod connected to said rock-shaft; and means for actuating said rod.

4. In a metal shearing or cutting machine, the combination, with two opposing dies having notched working surfaces, of grooved strippers located adjacent to the sides of each of said dies; rock-shafts having projections entering the grooves of said strippers; and means for alternately operating said rock-shafts.

5. In a metal shearing or cutting machine, the combination, with two opposing dies one of which is movable toward and from the other, of strippers located adjacent to the working surfaces of said dies; means for actuating said strippers; and links connected with the head carrying the movable die and with the bed-plate for operating said stripper-actuating means.

6. In a metal shearing or cutting machine, the combination, with a movable head, of a notched die mounted therein; a grooved stripper located adjacent to one side of said die; a rock-shaft having a nose or projection entering the groove of said stripper; a rod connected to said rock-shaft; and a link connecting said rod with the frame of the machine.

7. In a metal shearing or cutting machine, the combination of a movable head carrying a die notched on its working surface; a stripper having a longitudinal groove and mounted adjacent to the working surface of said die; a rock-shaft having a nose or projection fitting the groove of said stripper; a rod passing loosely through a slot in the head and connected to said rock-shaft; and a link connecting said rod to the frame of the machine.

8. In a machine of the class described, the combination, with a movable head carrying a die having a notched working surface, of a stripper having a longitudinal groove at its upper end; a rock-shaft having a nose or projection entering said longitudinal groove; means for limiting the movement of the stripper in either direction; a rod passing loosely through an opening in said head and connected with said rock-shaft; and a link connecting said rod with the frame of the machine.

9. In a machine of the class described, the combination, with a movable die having a notched lower end, of a stationary die also having a notched working surface; a stripper located adjacent to said stationary die; and means connected with the device carrying the movable die for actuating said stripper.

10. In a machine of the class described, the combination, with a pair of dies each of which is notched on its working surface, of strippers for freeing the material from said dies; means connected with the movable head for actuating said strippers; and a presser-foot for holding the material upon the stationary die.

WALTER E. CRANE.

Witnesses:
J. S. MACTAVISH,
WILLIAM PENDER.